United States Patent [19]

Omae et al.

[11] Patent Number: 4,701,802

[45] Date of Patent: Oct. 20, 1987

[54] CATHODE-RAY TUBE WITH MISALIGNMENT CORRECTING TENSION BAND

[75] Inventors: Kazuo Omae, Saitama; Hiroshi Okazaki, Chiba, both of Japan

[73] Assignee: Sony Corporation, Tokyo, Japan

[21] Appl. No.: 835,518

[22] Filed: Mar. 3, 1986

[30] Foreign Application Priority Data

Mar. 8, 1985 [JP] Japan .................................. 60-45981

[51] Int. Cl.⁴ ................................................ H04N 5/65

[52] U.S. Cl. .................................................... 358/246

[58] Field of Search ......................................... 358/246

[56] References Cited

U.S. PATENT DOCUMENTS 3,626,093 12/1971 Inglis .................................. 358/246

FOREIGN PATENT DOCUMENTS 1513337 10/1966 France ................................ 358/246

*Primary Examiner*—Michael A. Masinick

*Attorney, Agent, or Firm*—Hill, Van Santen, Steadman & Simpson

[57] ABSTRACT

A cathode-ray tube having an explosion-proof band shrink fitted on the periphery of the panel thereof and having recesses formed so as to adjust the effective sectional area of the explosion-proof band to a value appropriate for correcting the strain of the panel caused by the evacuation of the tube body of the cathode-ray tube. The size of the recesses is determined on the basis of a misalignment correction estimated theoretically by using measured data of deformation of the panel, so that the deformation of the panel surface is corrected appropriately, and thereby misalignment of electron beams is minimized.

11 Claims, 15 Drawing Figures

CATHODE-RAY TUBE WITH MISALIGNMENT CORRECTING TENSION BAND

BACKGROUND OF THE INVENTION

1. Field of the Invention

The present invention relates to a color cathode-ray tube (hereinafter referred to as "color CRT") capable of allowing optimum beam alignment and, more specifically, to a color CRT having an explosion-proof band shrink fitted around the periphery of the panel thereof so as to brace the panel appropriately according to an amount of correction necessary for proper alignment of electron beams. Furthermore, recesses are formed in the explosion-proof band to control the effective sectional area of the explosion-proof band according to an amount of correction to be made for aligning the electron beams.

2. Description of the Prior Art

In a conventional color CRT, as illustrated in FIGS. 10 to 12, an explosion-proof band 3 is shrink fitted around the periphery of the panel 2 of a tube body 1 to reinforce the tube body 1. FIGS. 10 and 11 illustrate CRTs each having a cylindrical panel 2, while FIG. 12 illustrates a CRT having a spherical panel 2. As shown in FIGS. 10 to 12, the lugs 4 are integrally attached to the corners of the explosion-proof band 3 for mounting the CRT on a frame.

When the tube body 1 is evacuated to a high vacuum, the panel surface and the general configuration of the tube body are deformed as illustrated in FIG. 14 and a large stress concentrates in the peripheral portion of the panel. Accordingly, the tube body is reinforced by the explosion-proof band 3, principally to apply an external force to the peripheral portion of the panel so that the stress is minimized and the original shape of the panel surface is restored to the maximum extent possible as indicated by broken lines. The band is called an explosion-proof band because it resists outward (or exploding) motion of the periphery of the tube. Thus, since the principal purpose of providing the explosion-proof band is to prevent the explosion of the tube body, it has been a conventional practice to control the recovery $\delta$ of the strain to reduce the strain to a minimum value and hence the variation of the recovery $\delta$. For example, in a 20-inch class CRT, $\delta$ has been in the range of $\pm 150$ μm.

In the industrial high-precision fine color CRT, as compared with the TV use color CRT, there is a small electron beam alignment tolerance for the fluorescent screen, for example, on the fluorescent stripes. In a color CRT, misalignment is liable to occur in areas A and B on both sides of the central area of the panel 2, as viewed from the front side of the panel 2, as illustrated in FIG. 13. In the areas A and B, the panel glass is subject to deformation (concave deformation) when the tube body is evacuated, and the positional variation of the fluorescent stripes is likely to occur when the conditions of the fluorescent screen forming process are not appropriate. Consequently, misalignment of electron beams occurs in the finished CRT, and hence the color purity of such a CRT is unsatisfactory.

On the other hand, as described hereinbefore, the tube body is reinforced by the explosion-proof band 3. However, the variation in the recovery $\delta$ of strain directly influences the color purity of the CRT. It has been a usual practice to correct misalignment in the areas A and B by adjusting the correction lens system in the fluorescent surface forming process. This conventional method is able to correct the apparent recovery $\delta$ of strain of every lot of CRTs, however, the method is unable to correct the recovery $\delta$ of strain of every CRT in a lot.

SUMMARY OF THE INVENTION

Accordingly, in view of such disadvantages of the conventional CRT, it is an object of the present ivention to satisfactorily reduce the variation of CTRs in a lot in the recovery $\delta$ of strain and to provide a CRT in which misalignment is reduced to the maximum possible extent.

In the areas A and B (FIG. 13) in the panel surface of an evacuated CRT, a misalignment correction $\Delta S$ for reducing the deviation of the fluorescent layer, namely, the fluorescent stripe, from the aligned position of an electron beam is expressed by an expression $$\Delta S = \alpha \cdot \delta(h) \quad (1)$$

where $\delta$ (h) is a recovery of strain, and $\alpha = 0.1$ to 0.3, for example, 0.18 to 0.19 for 20-inch high precision fine CRTs and about 0.3 for TV use CRTs. The values of $\Delta S$ and $\delta$ (h) are expressed in micrometers. The value of $\delta$ (h) is that which causes misalignment of electron beams and includes the inside deformation of the panel surface of an evacuated CRT body and deviation of the fluorescent stripes from the correct position resulting from a faulty fluorescent screen forming process.

The value of recovery $\delta$ (h) is proportional to the tension T of the explosion-proof band 3, and hence $$\delta(h) = \gamma T \quad (2)$$

where $\gamma$ (μm/kg) is a constant within the range of 0.02 and 0.1, for example about 0.05 μm/kg for 20-inch high procision fine CRTs and about 0.07 and 0.08 μm/kg for TV use CRTs. The smaller the value of $\gamma$, the more the shape of the surface of the panel approaches a flat surface.

The relation between the tension T of the explosion-proof band and the effective sectional area $t(h_0 - h)$ is expressed by $$T = \beta \cdot t(ho - h) \quad (3)$$

where t is the thickness of the explosion-proof band, ho is the overall width of the same, h is the length of a recess 10 (FIG. 4), and $\beta$ is a constant corresponding to upper yield point, which is specific to a material, for example, $\beta = 26$ to 32 kg/mm for (SPC).

The values of h and $h_o$ are expressed in millimeters. From Expressions (1) to (3), $$\Delta S = \alpha \cdot \gamma \cdot \beta \cdot t(h_o - h) \quad (4)$$

From Expression (4), the misalignment correction $\Delta S$ is proportional to the effective sectional area $t(h_o - h)$ of the explosion-proof band 3.

According to the present invention, the explosion-proof band 3 to be fitted on the periphery of the panel 2 of the tube body 1 of a CRT is provided with slits 10, slots 11 or holes 12 so that the effective sectional area of the explosion-proof band 3 corresponds to the necessary misalignment correction $\Delta S$.

The value of h corresponding to the necessary misalignment correction $\Delta S$ is determined by using Expression (4), and then slits having a length h are formed in the explosion-proof band 3 to provide a proper effective sectional area, whereby misalignment is minimized.

These and other objects, features and advantages of the present invention will become more apparent from the description of the preferred embodiments of the invention taken in conjunction with the accompanying drawings.

DESCRIPTION OF THE PREFERRED EMBODIMENTS

Preferred embodiments of CRTs according to the present invention will be described hereinafter in conjunction with the accompanying drawings.

Figure 1:
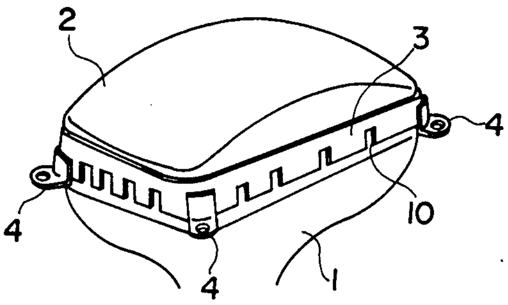
FIGS. 1 to 3 are perspective views of preferred embodiments of CRTs according to the present invention, respectively.
Figure 2:
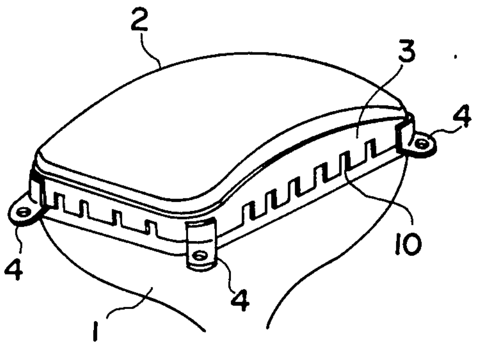
Figure 3:
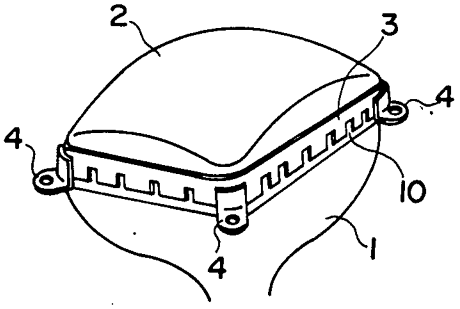
Figure 4:
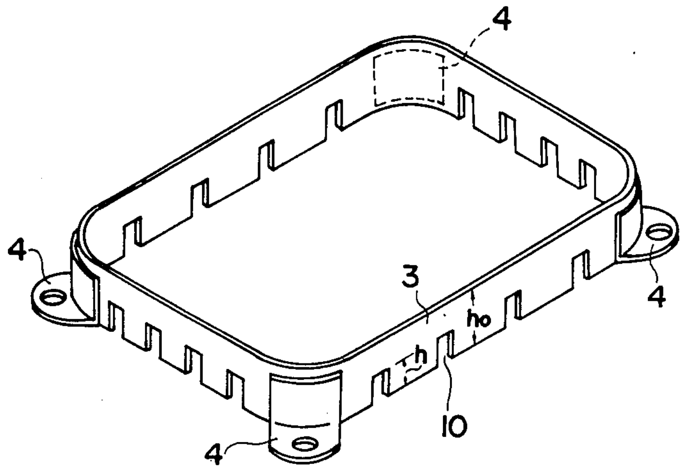
FIGS. 4 to 8 are perspective views of exemplary explosion-proof bands employed in CRTs according to the present invention, respectively.
Figure 5:
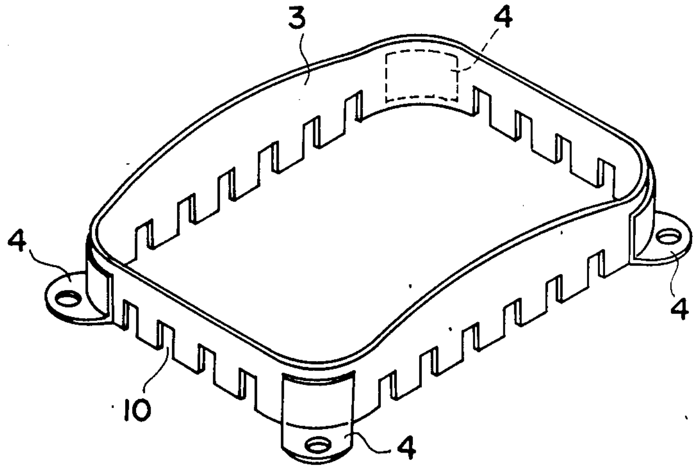
Figure 13:
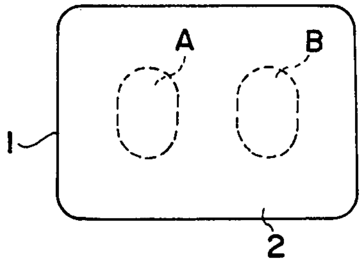
FIG. 13 is a plan view showing the panel surface of a CRT.
Figure 14:
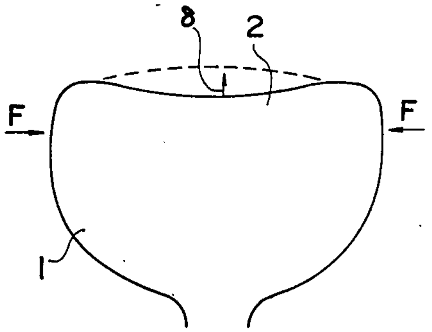
FIG. 14 is a schematic side elevation of a CRT.

According to the present invention, prior to fitting an explosion-proof band on the periphery of a CRT, the positional deviation of the fluorescent layers, for example, fluorescent stripes, in the areas A and B (FIG. 13) from the correct position, namely, a misalignment correction $\Delta S$ is measured. Then the value of h is determined from the measured misalignment correction $\Delta S$ by using Expression (4). Next, slits 10 having a length h are formed in an explosion-proof band 3 as illustrated in FIG. 4 or 5, to adjust the effective sectional area of the explosion-proof band 3. Then the explosion-proof band 3 provided with the appropriate slits 10, is fitted on the periphery of the panel 2 of the CRT 1. FIGS. 1 and 2 illustrate CRTs each having a panel 2 with a cylindrical surface and explosion-proof bands appropriate therefor, and FIG. 3 illustrates a CRT having a panel 2 with a spherical surface and an explosion-proof band appropriate therefor. A plurality of slits 10 are formed in the explosion-proof band 3 so that tension distribution in the explosion-proof band 3 is uniform. The number of the slits 10 is dependent on the size and shape of the CRT. An explosion-proof band, for example, for a rectangular CRT, is provided with one or more slits 10 in each side thereof.

The effective sectional area of the explosion-proof band 3 is adjusted by forming slits 10 in the explosion-proof band 3, which slits having a length h determined on the basis of the measured misalignment correction $\Delta S$, and thereby variation between CRTs in the recovery $\delta$ (h) of strain is reduced to the minimum extent, for example, to a variation within the range of $\pm 5$ $\mu$m. Consequently, optimum electron beam alignment is ensured and, simultaneously, satisfactory explosion-proof effect is obtained. The proportional constant $\beta$ of Expressions (3) and (4) and the thickness t are specific values for the lot of the explosion-proof bands. The value of length h is properly determined according to the values of the proportional constant $\beta$ and the thickness t.

Figure 6:
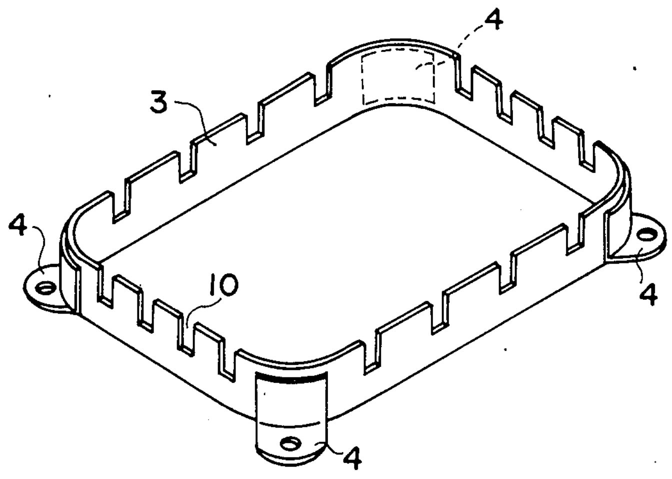

The slits 10 may be formed in the funnel side of the explosion-proof band 3 as illustrated in FIG. 4 or in the panel side of the same as illustrated in FIG. 6. However, in view of the explosion-proof effect, it is preferable to form the slits in the funnel side of the explosion-proof band 3.

Figure 8:
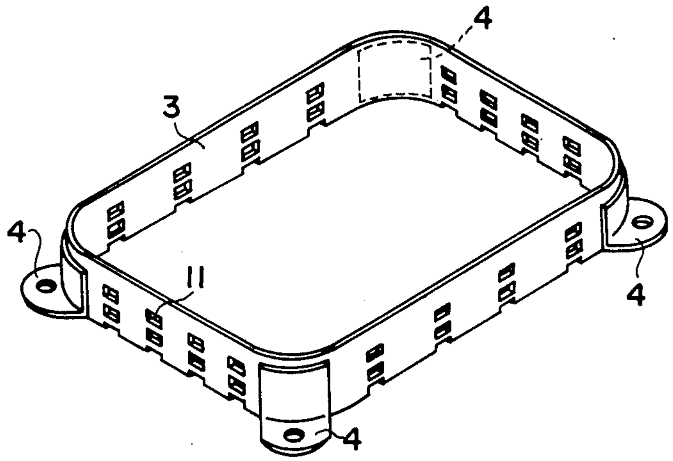
Figure 9A:
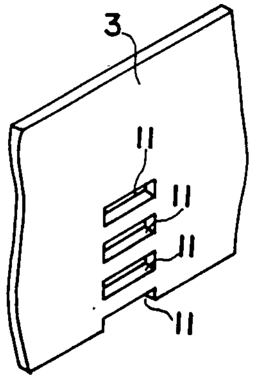
FIGS. 9A and 9B are fragmentary perspective views of the explosion-proof band of FIG. 8, as incorporated into a CRT.
Figure 9B:
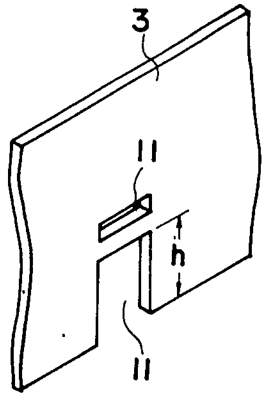
Figure 10:
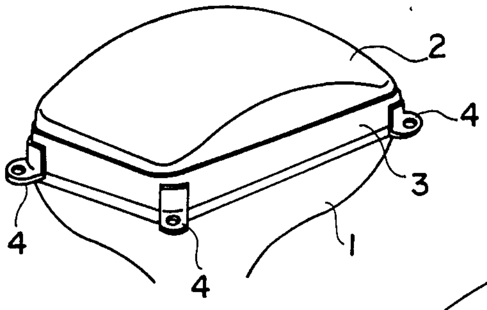
FIGS. 10 to 12 are perspective views of conventional CRTs.
Figure 11:
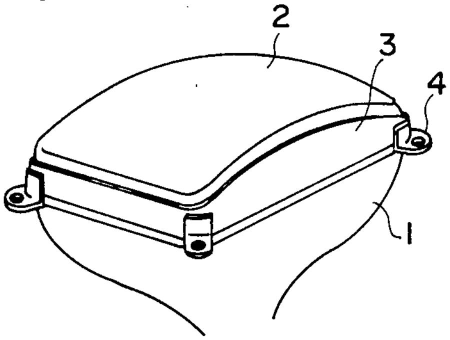
Figure 12:
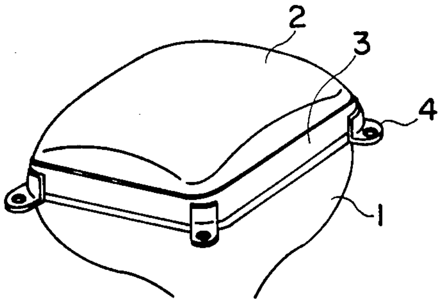

FIGS. 8, 9A and 9B illustrate an explosion-proof band employed in another embodiment of the present invention. This explosion-proof band 3 is provided with a plurality of slots 11 having the same width, formed at each of a plurality of positions on the periphery thereof. After fitting the explosion-proof band 3 on the periphery of the panel 2 of a CRT, portions of the wall extending between the adjacent slots 11 are cut out to form slits having a length h so that the effective sectional area of the explosion-proof band 3 is adjusted to a desired value.

In a further embodiment of the present invention, an appropriate explosion-proof band 3 having an effective sectional area which meets the misalignment correction $\Delta S$ of a CRT most properly is selected from a plurality of prefabricated explosion-proof bands differing from each other in the length of the slots, and the selected explosion-proof band 3 is fitted on the periphery of the CRT.

Figure 7:
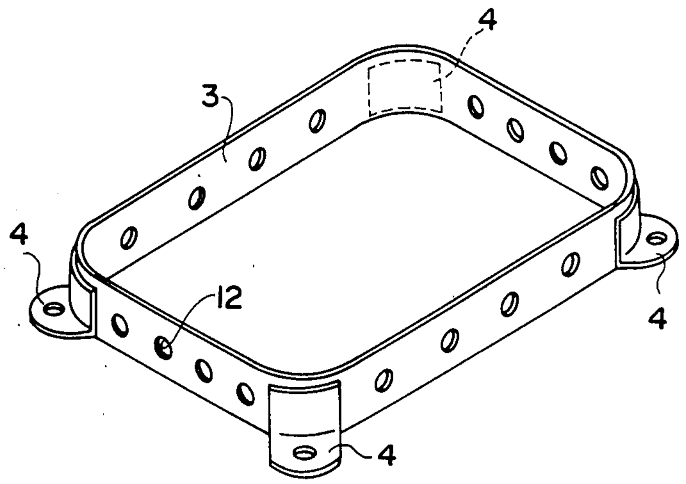

The explosion-proof bands employed in the above-mentioned embodiments of the present invention are provided with slits 10 or slots 11, however, the explosion-proof bands for use in the present invention may be provided with holes 12 of a predetermined shape as illustrated in FIG. 7.

The present invention is applicable to a CRT provided with a safety panel disposed in front of the panel thereof with the space between the safety panel and the panel filled with an explosion-proof resin and to a CRT provided with a metallic shell enclosing the tube body thereof.

Although the invention has been described as applied to CRTs having a fluorescent surface consisting of fluorescent stripes, the present invention is applicable also to a color CRT having a fluorescent surface consisting of fluorescent dots.

As is apparent from the foregoing description of the preferred embodiments of the present invention, according to the present invention, the effective sectional area of an explosion-proof band to be fitted on the periphery of a CRT by shrink fitting is adjusted according to the necessary misalignment correction $\Delta S$ of the CRT by forming appropriate recesses in the explosion-proof band, and hence the explosion-proof band explosion-proofs the CRT and remarkably reduces the variation of the recovery $\delta$ (h) of strain between CRTs. Accordingly, the present invention minimizes the degree of misalignment of individual CRTs.

According to the prior art, CRTs having the same panels and different tube bodies require different explosion-proof bands, respectively, whereas, according to the present invention, an explosion-proof band of a standard type is applicable to such CRTs having the same panels and different tube bodies, respectively, by adjusting the effective sectional area thereof to an appropriate value by forming recesses having an appropriate size therein. Thus the explosion-proof band of the present invention explosion-proofs the CRT and also corrects beam alignment. Accordingly, the present invention reduces the cost of material procurement and that of manufacturing CRTs.

The present invention is applied particularly effectively to a high-precision fine color CRT which has a very small alignment tolerance.

Although the invention has been described in its preferred form with a certain degree of particularity, it is to be understood that many variations and changes in the invention are possible without departing from the scope and spirit thereof.

We claim as our invention:

1. A cathode-ray tube comprising an explosion-proof tension band fitted on the periphery of the panel of the tube body of the cathode-ray tube adapted to apply a compressive force to the periphery of said tube as a result of tension in said band, said band having recesses formed so as to adjust the effective sectional area thereof to a value appropriate for correcting the deformation of the panel caused by the evacuation of the tube body and causing the misalignment of electron beams on the fluorescent surface of the panel.

2. A cathode-ray tube according to claim 1, wherein said recesses are formed in the funnel side of the explosion-proof band.

3. A cathode-ray tube according to claim 1, wherein said recesses are formed in the panel side of the explosion-proof band.

4. A cathode-ray tube according to claim 1, wherein said recesses are apertures of any appropriate shape previously formed in the explosion-proof band.

5. A cathode-ray tube according to claim 1, wherein said explosion-proof band forms recesses shaped as slots.

6. A cathode-ray tube according to claim 1, wherein said explosion-proof band forms recesses shaped as slits.

7. A cathode-ray tube according to claim 1, wherein said explosion-proof band forms recesses shaped as holes.

8. A cathode-ray tube according to claim 1, wherein adjustment of the effective sectional area of the explosion-proof band is defined by a misalignment correction factor $\Delta S$, which is proportional to $t(h_o-h)$, wherein t is the thickness of the explosion-proof band, $h_o$ is the overall width of said band, and h is the length of the recess.

9. A cathode-ray tube as in claim 8, wherein $\Delta S$ equals $\alpha \cdot \beta \cdot t$ (h—h), wherein $\alpha$ is a constant related to the size of the CRT and $\beta$ is a constant corresponding to the upper yield point of the band material.

10. A cathode-ray tube as in claim 9, wherein $\alpha$ is between 0.1 and 0.3.

11. A cathode-ray tube as in claim 1, wherein the explosion-proof band is shrink fitted onto the periphery of the panel of the tube body.

* * * * *